United States Patent

Ogiwara et al.

[11] Patent Number: 5,959,000
[45] Date of Patent: Sep. 28, 1999

[54] ERASABLE INK

[75] Inventors: Yasuaki Ogiwara, Urawa; Kiyokazu Sakurai, Kodama-gun; Atsushi Iwasa, Tano-gun, all of Japan

[73] Assignee: Mitsubishi Pencil Kabushiki Kaisha, Tokyo, Japan

[21] Appl. No.: 08/848,821

[22] Filed: May 1, 1997

[30] Foreign Application Priority Data

May 1, 1996 [JP] Japan ...................................... 8-111021
May 1, 1996 [JP] Japan ...................................... 8-111022

[51] Int. Cl.$^6$ ...................................... C09D 5/00
[52] U.S. Cl. .......................... 523/161; 524/800; 524/801; 524/804; 524/836
[58] Field of Search ...................................... 524/800, 801, 524/804, 836; 523/161

[56] References Cited

U.S. PATENT DOCUMENTS

| | | | |
|---|---|---|---|
| 4,039,500 | 8/1977 | Bassett et al. | 260/29.6 R |
| 4,297,260 | 10/1981 | Ferree, Jr. et al. | 260/29.7 H |
| 5,217,255 | 6/1993 | Lin et al. | 281/15.1 |
| 5,272,212 | 12/1993 | Kitihara | 525/301 |
| 5,621,021 | 4/1997 | Yoshioka et al. | 523/161 |

*Primary Examiner*—Edward J. Cain
*Attorney, Agent, or Firm*—Darby & Darby

[57] ABSTRACT

Provided is an erasable ink comprising an emulsion liquid prepared by polymerizing a polymerizable monomer containing a conjugate diene compound in a solvent containing water in the presence of a dye and a surfactant, wherein the polymerizable monomer may contain a vinyl compound as well as a conjugate diene compound, and used are 0.01 to 100 parts by weight of the dye and 0.1 to 30 parts by weight of the surfactant each per 100 parts by weight of the polymerizable monomer.

9 Claims, No Drawings

ERASABLE INK

BACKGROUND OF THE INVENTION (1) Field of the Invention

The present invention relates to an erasable ink the lines drawn with which can be erased with an eraser.

(2) Description of the Related Art

An erasable ink the lines drawn with which can be erased with an eraser is disclosed in, for example, Japanese Patent Application Laid-Open No. Sho 59-223769 as "an erasable ink composition characterized by dispersing homogeneously a pigment selected from carbon black and aniline black in a water base medium dissolving polyethylene oxide in the presence of a surfactant containing a polyoxyethylene group". In this erasable ink, however, the erasability itself is not satisfactory and in particular, erasing after a long lapse of time is difficult. In addition to the above, erasable inks having various compositions have been proposed, but they have insufficient erasability and have not yet provided desired effects.

The present applicants disclosed in Japanese Patent Application Laid-Open No. Hei 7-56090, "an erasable ink characterized by containing a resin having a glass transition temperature of 0° C. or lower, colored spherical fine particles and water". However, lines drawn with this erasable ink on non-absorbing surfaces of glass, plastics and metals and surfaces of writing materials such as wood free paper can be erased well with erasing tools such as an eraser. In contrast with this, when lines are drawn on paper having a relatively coarse surface, a coloring component contained in the ink remains on the writing material because of the insufficient adherence of a pigment component used for a colorant to a binder resin which is a binding component for the colorant, and therefore the drawn lines can not completely be erased.

In the case where the erasable ink is charged into writing tools such as felt tip pens and ball point pens, the coloring component of the ink separates and settles down in the pen bodies after a long lapse of time because of the large particle size thereof. Accordingly, the storage stability grows worse, so that the concentrations of the coloring component and the resin component of the ink running out of the pen point are reduced, and therefore the writing performance is deteriorated. Further, there is the defect that the ink is liable to be dried at an ink flowing part of the pen body because of an emulsion resin of a high concentration contained in the ink. In the case where the ink is charged into an ink tank comprising an ink absorber such as cotton, there is caused the problem that it is difficult for the ink to flow smoothly because of the high viscosity thereof.

SUMMARY OF THE INVENTION

An object of the present invention is to provide an erasable ink in which a coloring component is stably dispersed without separating from a binder resin component and which is excellent in erasability and preservability.

Intensive investigations made by the present inventors have resulted in finding that the object described above can be achieved by using an emulsion liquid prepared by polymerizing a polymerizable monomer containing a conjugate diene compound in a water base medium containing a dye and a surfactant, and coming to complete the erasable ink of the present invention.

That is, the erasable ink of the present invention is characterized by comprising an emulsion liquid prepared by polymerizing a polymerizable monomer containing a conjugate diene compound in the presence of a dye and a surfactant.

Water of 30 to 99 weight % based on the whole amount of the ink is preferably contained. The polymerizable monomer containing the conjugate diene compound is preferably a conjugate diene compound or a mixed monomer comprising a conjugate diene compound of 30 weight % or more and a vinyl compound of less than 70 weight %.

The erasable ink of the present invention has low penetrability into paper, and the drawn line film can readily be broken due to flexibility provided to the resin. Further, when the drawn line film is peeled off from paper, the colored particles infiltrating into fibers of paper can be torn off together, and therefore the drawn lines can very easily be erased with an eraser.

The dispersion stability of the colored polymer particles in the ink is good because of a small particle diameter thereof, and therefore the ink having excellent aging stability is provided.

DETAILED DESCRIPTION OF PREFERRED EMBODIMENTS

The emulsion liquid used for the erasable ink of the present invention is obtained, for example, by dissolving a surfactant and a polymerization initiator in water, adding a mixed solution prepared by dissolving a dye in a polymerizable monomer containing a conjugate diene compound to the above aqueous solution while stirring and maintaining the aqueous solution at 0 to 90° C., and then effecting polymerization for 1 to 24 hours. The reaction is carried out in a nitrogen atmosphere. The dye is added in the polymerization reaction or after finishing the reaction. It is added preferably in the reaction.

The polymerization for preparing the erasable ink of the present invention is carried out in a water base medium blended with a polymerization initiator of 0.01 to 20 parts by weight, wherein the amount of the surfactant is 0.1 to 30 parts by weight, preferably 1 to 20 parts by weight, and the amount of the dye is 0.01 to 100 parts by weight, preferably 0.1 to 100 parts by weight each per 100 parts by weight of the polymerizable monomer containing the conjugate diene compound. The amount of the water base medium is preferably controlled so that the content of water contained in the resulting erasable ink is 30 to 99 weight %. The polymerization conditions are preferably a temperature of 0 to 90° C. and a time of 1 to 24 hours.

The polymerizable monomer used for the erasable ink of the present invention includes a conjugate diene compound and a monomer mixture of a conjugate diene compound and a vinyl compound. The content of the conjugate diene compound in the monomer mixture is 30 weight % or more and less than 100 weight %, preferably 50 to 95 weight % based on the weight of the monomer mixture. When the content of the conjugate diene compound in the monomer mixture is less than 30 weight %, characters and lines drawn with the erasable ink have insufficient film formability, and therefore the sufficient erasability is not obtained.

The conjugate diene compound used in the erasable ink of the present invention includes butadiene and isoprene.

The vinyl compound used for the erasable ink of the present invention includes aromatic group-containing vinyl compounds such as styrene; carboxyl group-containing vinyl compounds such as monocarboxylic acids including acrylic acid, methacrylic acid and crotonic acid, and polycarboxylic acids including maleic acid and itaconic acid, and vinyl group-containing carboxylic acid esters such as methyl methacrylate and ethyl methacrylate; hydroxyl group-containing vinyl compounds such as 2-hydroxyethyl acrylate, 2-hydroxyethyl methacrylate, 2-hydroxypropyl acrylate and 2-hydroxypropyl methacrylate; glycidyl group-containing vinyl compounds such as glycidyl acrylate, glycidyl methacrylate and allyl glycidyl ether; and cyano group-containing vinyl compounds such as acrylonitrile and methacrylonitrile.

These vinyl compounds are used alone or in a mixture of two or more kinds thereof. The content of the vinyl compound is less than 70 weight %, preferably 1 to 50 weight % based on the weight of the monomer mixture.

These vinyl compounds are components for improving the elasticity and the strength of the resulting colored polymer.

The carboxyl group-containing vinyl compounds, vinyl group-containing carboxylic acid esters, the hydroxyl group-containing vinyl compounds and the glycidyl group-containing vinyl compounds provide the polymer with colloidal stability. The content thereof in the monomer mixture is determined suitably according to the use purposes thereof and is preferably 50 weight % or less. The content exceeding 50 weight % tends to increase the viscosity of the resulting colored polymer, strengthen the adhesion of the drawn line film and therefore reduce the erasability.

The cyano group-containing vinyl compounds can contribute as a component for improving the coloring property and the light fastness of the dye. The content thereof in the monomer mixture is 50 weight % or less. The content exceeding 50 weight % or more reduces the flexibility of the drawn line film.

The dye used for the erasable ink of the present invention includes at least one selected from direct dyes, acid dyes, basic dyes, disperse dyes, oil soluble dyes, reactive dyes and fluorescent dyes, and these dyes can be used in combination with pigments. The dye shall not be restricted thereto.

In the erasable ink of the present invention, the dye is added in the polymerization or after finishing the polymerization. The conditions of the polymerzation reaction are preferably 0 to 90° C. and 1 to 24 hours in a nitrogen atmosphere.

The use amount of the dye is 0.01 to 100 parts by weight, preferably 0.1 to 100 parts by weight per 100 parts by weight of the polymerizable monomer.

Specific examples of the dye include the following ones shown in terms of a color index number (C. I.): C. I. Basic Yellow 35, C. I. Basic Yellow 40, C. I. Basic Blue 45, C. I. Basic Orange 21, C. I. Basic Violet 11, C. I. Basic Red 1, C. I. Acid Red 52, C. I. Acid Yellow 3, C. I. Acid Orange 28, C. I. Acid Blue 92, C. I. Acid Green 16, C. I. Solvent Yellow 21, C. I. Solvent Yellow 61, C. I. Solvent Green 3, C. I. Solvent Black 22, C. I. Solvent Black 23, C. I. Solvent Orange 5, C. I. Solvent Orange 40, C. I. Solvent Red 8, C. I. Solvent Red 49, C. I. Solvent Violet 8, C. I. Solvent Blue 2, C. I. Solvent Blue 73, C. I. Disperse Yellow 1, C. I. Disperse Yellow 61, C. I. Disperse Orange 3, C. I. Disperse Orange 45, C. I. Disperse Red 11, C. I. Disperse Red 80, C. I. Disperse Violet 8, C. I. Disperse Blue 5, C. I. Disperse Blue 27, C. I. Disperse Black 1 and C. I. Disperse Black 27.

The surfactant used for the erasable ink of the present invention includes anionic surfactants such as fatty acid salts, alkylsulfuric acid ester salts, alkylbenzenesulfonic acid salts, alkylnaphthalenesulfonic acid salts, alkylsulfosuccinic acid salts, alkylallylsulfosuccinic acid salts, alkyldiphenyl ether disulfonic acid salts, alkylphosphoric acid salts, polyoxyethylenealkylsulfuric acid ester salts, alkylallylsulfuric acid salts, naphthalenesulfonic acid formalin condensation product, specific polycarboxylic acid type polymer surfactant and polyoxyethylenealkylphosphoric esters; nonionic surfactants such as polyoxyethylenes, polyoxyethylene alkyl ethers, polyoxyethylene alkylallyl ethers, polyoxyethylene derivatives, oxyethylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylenealkylamines and alkylalkanolamides; and amphoteric surfactants such as alkylbetaines, acetic acid betaine and imidazolinium betaine. The kinds and amounts of the surfactants used can suitably be selected according to the purposes. These surfactants are used alone or in a mixture of two or more kinds thereof.

The amount of the surfactant used in the polymerization for preparing the erasable ink of the present invention is 0.1 to 30 parts by weight, preferably 1 to 20 parts by weight per 100 parts by weight of the polymerizable monomer. Further, the content thereof is 10 weight % or less, preferably 0.1 to 5 weight % based on the whole amount of the ink.

Ammonium persulfate, potassium persulfate and hydrogen peroxide can be used as a polymerization initiator used in the polymerization for preparing the erasable ink of the present invention. Usually, the polymerization initiator is used in an amount of 0.01 to 20 parts by weight per 100 parts by weight of the polymerizable monomer. If necessary, reducing agents such as ferrous sulfate, sodium hydrogensulfite and triethanolamine can be used in combination therewith.

In the polymerization for preparing the erasable ink of the present invention, molecular weight controlling agents such as n-dodecylmercaptan and electrolytes such as sodium phosphate as well as the essential components described above can be added in the polymerization.

Other additives which are usually used for inks for writing tools, for example, fungicides, organic solvents, antioxidants, defoaming agents and lubricants can be added, if necessary, to the erasable ink of the present invention. They may be added either in the polymerization or after finishing the polymerization. Further, a dryness inhibitor such as urea, thiourea and urea derivatives including ethyleneurea, and succharides such as pullulan can be used as additives.

In the erasable ink of the present invention, the flowability, the writing property and the preservability are improved by using a water soluble organic solvent.

This water soluble organic solvent includes alcohols such as ethanol, isopropyl alcohol, n-butyl alcohol, ethylene glycol and diethylene glycol, amides such as formamide and derivatives thereof, sulfoxides such as dimethylsulfoxide, and ethers such as ethylene glycol monomethyl ether, ethylene glycol monobutyl ether, ethylene glycol dibutyl ether, diethylene glycol monomethyl ether, diethylene glycol monoethyl ether, diethylene glycol monobutyl ether, diethylene glycol diethyl ether, diethylene glycol dibutyl ether, propylene glycol methyl ether, dipropylene glycol methyl ether, tripropylene glycol methyl ether, propylene glycol butyl ether, dipropylene glycol n-butyl ether, tripropylene glycol n-butyl ether, propylene glycol phenyl ether, ethylene glycol monoethyl ether, ethylene glycol monohexyl ether, ethylene glycol monophenyl ether, ethylene glycol mono-2-ethylbutyl ether, propylene glycol ethyl ether and propylene glycol tertiary butyl ether.

In the erasable ink of the present invention, the viscosity of the resulting ink and the adhesion of the ink on a writing medium such as paper can be controlled by adding a water soluble polymer and an emulsion resin. They may be added either in the polymerization or after finishing the polymerization.

The water soluble polymer includes polyvinyl alcohol, polyvinylpyrrolidone, methyl cellulose and carboxymethyl cellulose, and the emulsion resin includes SBR latex, NBR latex, acrylic resin emulsion and vinyl acetate resin emulsion.

In the erasable ink of the present invention, the content of water is 30 to 99 weight %, preferably 40 to 95 weight % based on the whole amount of the ink. Demineralized water is preferably used.

EXAMPLES

The erasable ink of the present invention shall be explained below with reference to examples.

Example 1

The following components were blended and polymerized to thereby obtain an erasable ink of the present invention.

| | |
|---|---|
| Butadiene | 55 g |
| Styrene | 15 g |
| Dye (Kayaset Yellow 2G manufactured by Nippon kayaku Co., Ltd.) | 2 g |
| Polyoxyethylene nonylphenyl ether (NP-10 manufactured by Nikko Chemicals Co., Ltd.) | 5 g |
| Potassium persulfate | 0.8 g |
| Demineralized water | 220 g |

The resulting ink had a viscosity of 2.2 mPa·s (25° C.) and was excellent in erasability and storage stability. The colored polymer contained in the ink had a particle diameter of 0.09 micron.

Example 2

The following components were blended and polymerized to thereby obtain an erasable ink of the present invention.

| | |
|---|---|
| Butadiene | 55 g |
| Styrene | 15 g |
| Dye (Kayaset Yellow FN manufactured by Nippon kayaku Co., Ltd.) | 2 g |
| Polyoxyethylene nonylphenyl ether (NP-10 manufactured by Nikko Chemicals Co., Ltd.) | 5 g |
| Potassium persulfate | 0.8 g |
| Demineralized water | 220 g |

The resulting ink had a viscosity of 2.2 mPa·s (25° C.) and was excellent in erasability and storage stability. The colored polymer contained in the ink had a particle diameter of 0.09 micron.

Example 3

The following components were blended and polymerized to thereby obtain an erasable ink of the present invention.

| | |
|---|---|
| Butadiene | 60 g |
| Acrylonitrile | 20 g |
| Dye (Sumiplast Green G manufactured by Sumitomo Chemical Ind. Co., Ltd.) | 1.2 g |
| Polyoxyethylene nonylphenyl ether (Emurgen 920 manufactured by Kao Co., Ltd.) | 1.8 g |
| Ammonium persulfate | 1.1 g |
| Demineralized water | 230 g |

The resulting ink had a viscosity of 3.8 mPa·s (25° C.) and was excellent in erasability and storage stability. The colored polymer contained in the ink had a particle diameter of 0.11 micron.

Example 4

The following components were blended and polymerized to thereby obtain an erasable ink of the present invention.

| | |
|---|---|
| Butadiene | 60 g |
| Acrylonitrile | 20 g |
| Dye (Vali Fast Yellow #3104 manufactured by Orient Chemical Co., Ltd.) | 1.2 g |
| Polyoxyethylene nonylphenyl ether (Emurgen 920 manufactured by Kao Co., Ltd.) | 1.8 g |
| Ammonium persulfate | 1.1 g |
| Demineralized water | 230 g |

The resulting ink had a viscosity of 3.8 mPa·s (25° C.) and was excellent in erasability and storage stability. The colored polymer contained in the ink had a particle diameter of 0.11 micron.

Example 5

The following components were blended and polymerized to thereby obtain an erasable ink of the present invention.

| | |
|---|---|
| Butadiene | 55 g |
| Styrene | 10 g |
| Acrylonitrile | 14 g |
| Dye (Brill. Flavine 10GFH manufactured by Hodogaya Chemical Co., Ltd.) | 1.0 g |
| Sodium alkylbenzenesulfonate (Neopelex F-25 manufactured by Kao Co., Ltd.) | 2.8 g |
| 2,2'-azobis(2-methylpropionamidine) dihydrochloride (V-50 manufactured by Wako Junyaku Co., Ltd.) | 0.5 g |
| Demineralized water | 195 g |

The resulting ink had a viscosity of 4.5 mPa·s (25° C.) and was excellent in erasability and storage stability. The colored polymer contained in the ink had a particle diameter of 0.12 micron.

Example 6

The following components were blended and polymerized to thereby obtain an erasable ink of the present invention.

| | |
|---|---|
| Butadiene | 55 g |
| Styrene | 10 g |
| Acrylonitrile | 14 g |
| Dye (Sumikaron Blue BR manufactured | 1.0 g |

-continued

| | |
|---|---|
| by Sumitomo Chemical Ind. Co., Ltd.) | |
| Sodium alkylbenzenesulfonate | 2.8 g |
| (Neopelex F-25 manufactured by Kao Co., Ltd.) | |
| 2,2'-azobis(2-methylpropionamidine) | 0.5 g |
| dihydrochloride (V-50 manufactured by | |
| Wako Junyaku Co., Ltd.) | |
| Demineralized water | 195 g |

The resulting ink had a viscosity of 4.5 mPa•s (25° C.) and was excellent in erasability and storage stability. The colored polymer contained in the ink had a particle diameter of 0.12 micron.

Example 7

The following components were blended and polymerized to thereby obtain an erasable ink of the present invention.

| | |
|---|---|
| Butadiene | 60 g |
| Styrene | 8 g |
| Butyl acrylate | 11 g |
| Dye (Oil Pink OP manufactured by Orient Chemical Co., Ltd.) | 6 g |
| Adekalia soap SE-10N (manufactured by Asahi Denka Co., Ltd.) | 1.0 g |
| Potassium persulfate | 1.2 g |
| Sodium hydrogensulfite | 1.2 g |
| Demineralized water | 216 g |

The resulting ink had a viscosity of 4.1 mPa•s (25° C.) and was excellent in erasability and storage stability. The colored polymer contained in the ink had a particle diameter of 0.09 micron.

What is claimed is:

1. An erasable ink comprising an emulsion liquid prepared by polymerizing a polymerizable monomer containing a conjugated diene in the presence of a solvent comprising water, a dye, and a surfactant.

2. The erasable ink as described in claim 1, wherein said ink comprises about 30 to about 99 weight % water based on the total composition of the ink.

3. The erasable ink as described in claim 2, wherein the emulsion liquid is prepared by polymerizing 100 parts by weight of the polymerizable monomer in the presence of said solvent, said solvent being water-based and comprising 0.001 to 100 parts by weight of the dye and 0.1 to 30 parts by weight of the surfactant.

4. The erasable ink as described in claim 1, wherein the polymerizable monomer is a conjugated diene.

5. The erasable ink as described in claim 1, wherein the polymerizable monomer is a mixed monomer comprising 30 weight % or more of a conjugated diene and less than 70 weight % of a vinyl compound.

6. A process for producing an erasable ink, comprising polymerizing 100 parts by weight of a polymerizable monomer containing a conjugated diene in the presence of a solvent, said solvent comprising waters, 0.01 to 100 parts by weight of a dye, and 0.1 to 30 parts by weight of a surfactant.

7. The erasable ink as claimed in claim 1 wherein the conjugated diene is butadiene.

8. The erasable ink as claimed in claim 4, wherein the conjugated diene is butadiene.

9. The erasable ink as claimed in claim 5, wherein the conjugated diene is butadiene and the vinyl compound is styrene.

* * * * *